United States Patent

[11] 3,627,865

| [72] | Inventors | Paul Wittwer<br>Paris;<br>Henri F. Chabaglian, Maisons Laffitte, both of France; Horst Ritzmann, Neubeckum, Germany |
|---|---|---|
| [21] | Appl. No. | 811,104 |
| [22] | Filed | Mar. 27, 1969 |
| [45] | Patented | Dec. 14, 1971 |
| [73] | Assignee | Polysius A.G.<br>Neubeckum, Germany |
| [32] | Priority | Apr. 1, 1968 |
| [33] | | France |
| [31] | | 146695 |

[54] METHOD AND APPARATUS FOR PRODUCING MINERAL AGGLOMERATES
2 Claims, 4 Drawing Figs.

[52] U.S. Cl. ............................................. 264/118, 264/232, 264/141
[51] Int. Cl. ........................................... B01j 2/20
[50] Field of Search ......................................... 264/117, 15, 141, 232, 118

[56] References Cited
UNITED STATES PATENTS

| 2,543,898 | 3/1951 | De Vaney.................. | 264/15 |
| 2,630,617 | 3/1953 | Robinson .................. | 264/141 |
| 3,078,518 | 2/1963 | Haden et al.................. | 264/15 |

*Primary Examiner*—Robert F. White
*Assistant Examiner*—J. R. Hall
*Attorney*—Marshall and Yeasting

ABSTRACT: The raw material for use in a metallurgical process is prepared in the form of agglomerates by mechanically pulverizing at least a part of a raw mineral to produce a powder having a specific surface between 2,000 and 5,000 square cm. per gram, the largest particles of which are smaller than 500 microns. The powder is mixed with a liquid to produce a paste, and the paste is extruded through perforations to produce rods having a diameter of 5 to 40 mm., the rods being separated into pellets having a length between 0.7 and 2.5 times their diameter. The pellets are rolled to round off their rough edges and then are preheated at a temperature between 500° and 850° C. to condition them for use in the metallurgical process.

METHOD AND APPARATUS FOR PRODUCING MINERAL AGGLOMERATES

The invention relates to a process for the production and thermal treatment of agglomerates of mineral or of mixtures of all kinds, for example of iron ore.

In the mineral industries, one often has occasion, before the metallurgical treatment, to form the finely divided mineral or minerals into discrete particles, or agglomerates, for example in a granulating drum, which particles are subjected to a heat treatment which gives them the physical and chemical characteristics required for said metallurgical treatment.

This heat treatment comprises several phases (drying, preheating, sintering) and may take place in one or several pieces of apparatus. It may or may not involve agitation of the agglomerates, for example in a grate rotary kiln system, on a traveling grate, in a vertical furnace, etc.

In carrying out such a process, one is limited by the sensitivity of the agglomerates to thermal shock, and by their mechanical solidity during the relative movement which occurs in the course of the treatment. These limitations lend to consideration of one or more of the following factors, upon which the physical and chemical transformations of the agglomerates depend during the different stages of treatment: temperatures, retention time, nature of the gaseous atmosphere.

These different factors are correlated with one another.

Great sensitivity of the raw agglomerates to thermal shock requires a very gradual rate of increase of temperature. But in that manner, one limits the production capacity of the apparatus, or of the apparatus in which the initial treatment takes place.

When there is agitation, for example in the grate rotary kiln system, at the end of the preheating on the grate, a good mechanical solidity of the agglomerates is desirable at the time of such agitation.

One may then increase the retention time, but in so doing one decreases the production capacity of the grate.

For certain minerals, it is necessary, if other conditions remain unchanged, to increase the temperature of preheating, for example to more than 1,000° C. for self-fluxing iron ores. This leads to great technological difficulties for the designing and selection of steels for the grate.

One way of alleviating these difficulties is to provide a protective layer for the grate, which is still delicate and expensive.

Also, in order to increase the solidity of the agglomerates in the course of the treatment, one may add to the heat treated powder, for example, predetermined amounts of bentonite. This is not always possible, having regard to the desired quality of the final product, and further is also delicate and costly.

Also known is the importance of the fineness of grinding, in other words the proportion of ultra fine and colloidal material in the powder, upon the mechanical characteristics of the agglomerates at the end of the preheating. Other conditions being equal, greater fineness entails better resistance; but on the other hand, aside from the expense of pulverization, the sensitivity to thermal shock of the agglomerates is greater.

The object of the present invention is to provide a process for producing and heat treating agglomerates of minerals of all kinds, or mixtures of minerals with one another and/or with a fuel, and/or a mineral additive such as a flux. This process makes it possible to diminish the disadvantages hereinbefore described, i.e. the disadvantages of sensitivity to thermal shock of the crude agglomerates, and permits, in the grate rotary kiln system, with a temperature of preheating less than that in current use, and without increasing, in comparison to corresponding granules, the fineness of the initial powder, the achievement, in the output of the grate, of high resistance to abrasion and to compression.

The invention has then for its object to provide a process of producing mineral agglomerates of the type hereinbefore described, which is remarkable in that the starting material is prepared in an extrusion relatively large particle size, and after being moistened is formed by extrusion, after which the pellets thus formed are heat treated at least for the first two phases in a porous bed, the temperature of the preheating phase being relatively low.

Other related characteristics of the invention will be apparent from the following detailed description, in which reference is had to the accompanying drawings. It will be understood that the description and the drawings are given by way of example and not be way of limitation.

The process according to the invention comprises the following operations:

First, a powdered starting material is produced by pulverization of at least a part of the mineral, the specific surface of such powder being less than that which is necessary to form granules of the same solidity. Preferably, the mineral is pulverized to such a degree that the specific surface of the powdered raw material is between 2,000 and 5,000 cm.$^2$/g. Blaine, and so that the largest of the particles is smaller than 500 microns.

Thereafter, the powdered raw material is moistened with a liquid to which a binder may be added. The paste thus formed, which may be homogenized, is shaped into pieces in the form of pellets.

The agglomerates in the form of pellets preferably have an exterior surface which is perfectly smooth, with a diameter of 5 to 40 mm. and a length between 0.7 and 2.5 times their diameter.

The pellets either are separated mechanically or are broken apart under the effect of gravity. In that case, the lengths into which they are broken may be partially controlled by modifying the preparation of the paste.

The agglomerates in the form of pellets, in accordance with the process of the invention, preferably are rolled to round off their rough edges, and may be screened, before being subjected to a heat treatment which may take place in an oxidizing or reducing atmosphere. For iron ore, the temperature of preheating of the material preferably is between 500° and 850° C., which is lower than that in use up to the present time for treatment of granules.

The following has been observed:

The agglomerates in the form of pellets produced in accordance with the invention exhibit, in comparison with granules produced from the same powder, a resistance to compression and to abrasion after completion of the preheating which is much greater.

Figure 1:
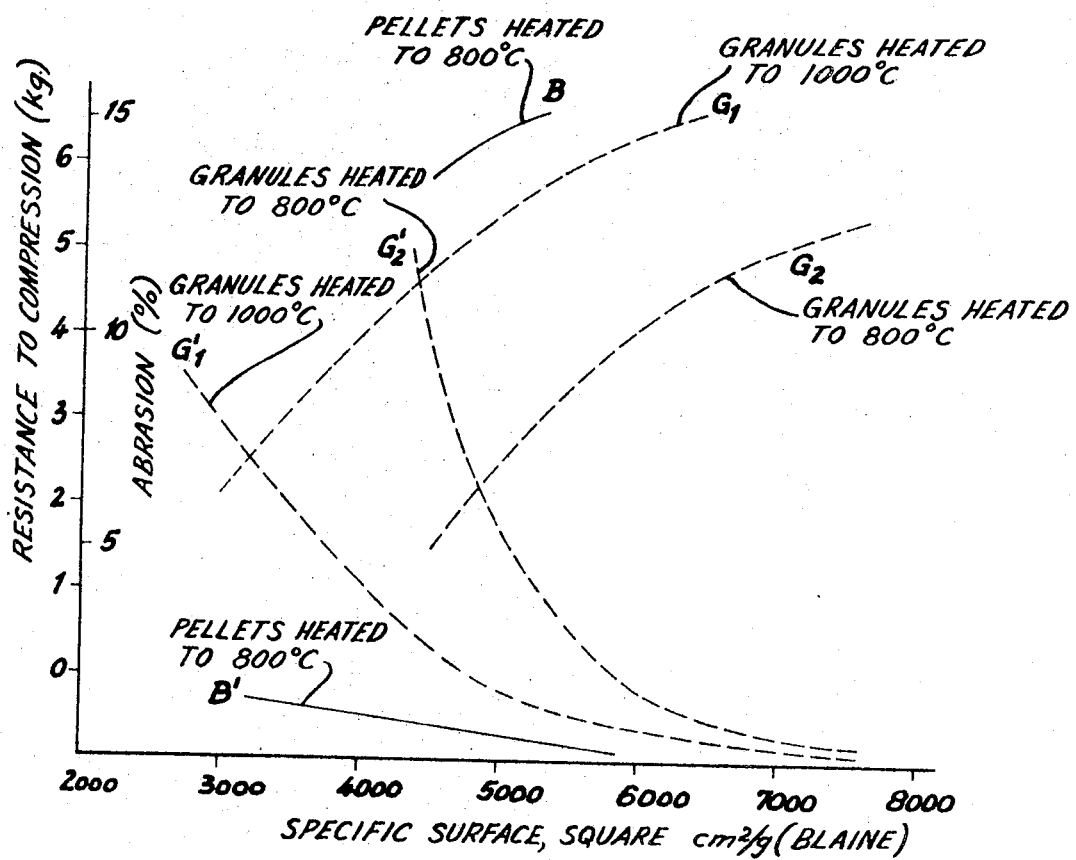
FIG. 1 is a diagram showing the variation of the resistance to compression in kg. and the degree of abrasion in per cent, for known granules and for the agglomerates of the invention, as a function of the specific surface in square cm. per gram of the initial powder.
Figure 2:
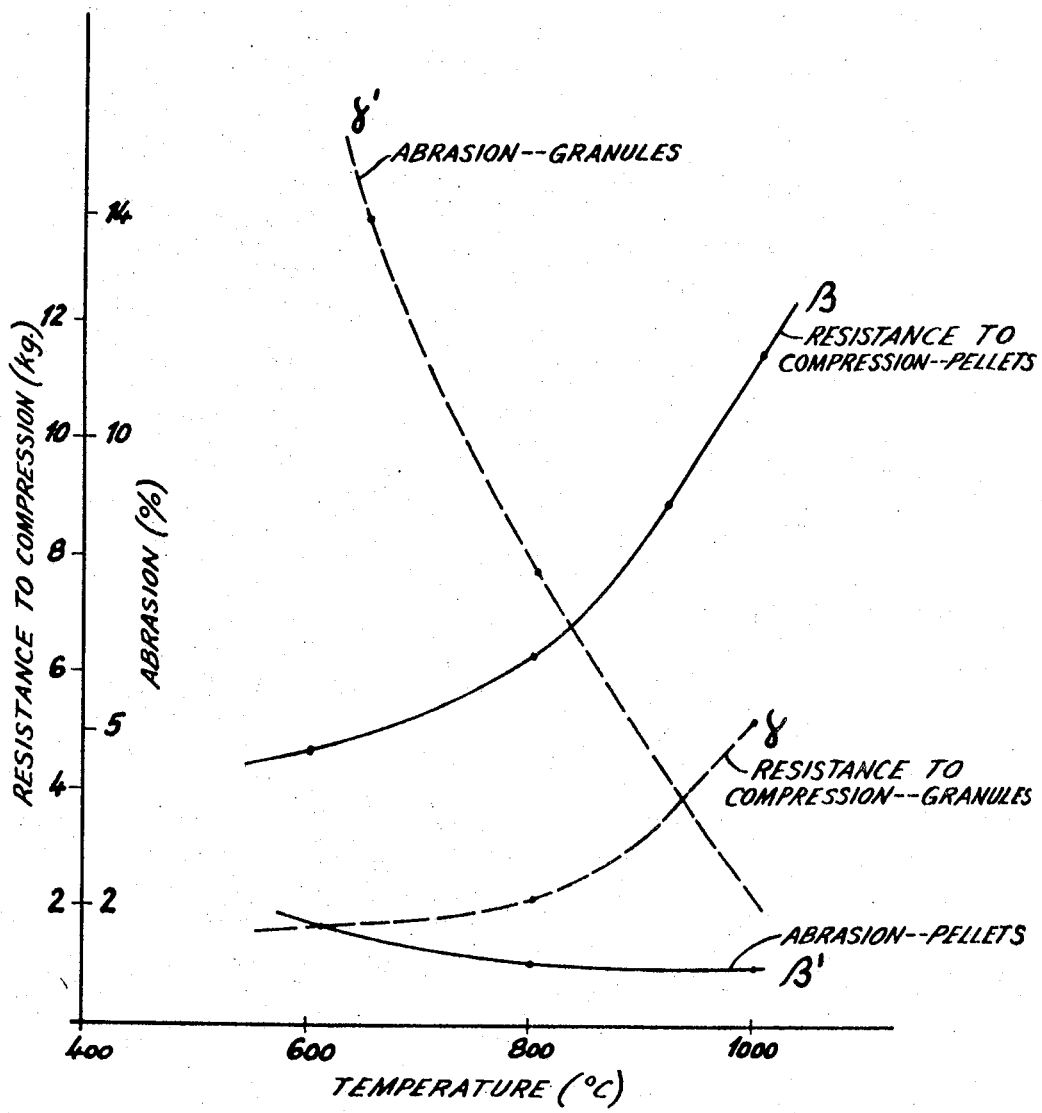
FIG. 2 is a diagram similar to that of FIG. 1, but shown as a function of the temperature of treatment in degrees C.

FIGS. 1 and 2 show the results of tests made with a concentrate of calcareous lorrain iron ore.

For these tests, the concentrate has been pulverized to different fineness, and then made in part into granules according to the known process and in part made into agglomerates in the form of pellets in accordance with the invention, and the granules and pellets have been preheated to different temperatures.

FIG. 1 shows that regardless of the fineness of pulverization, the resistance to compression in kg. of the agglomerates in the form of pellets preheated to 800° C. (curve B) is superior to that of granules preheated to 1,000° C. (curve $G_1$), and greatly superior to that of granules preheated to 800° C. (curve $G_2$). Similarly, the per cent abrasion of agglomerates in the form of pellets preheated to 800° C. (curve B') is less than that of granules preheated to 1,000° C. (curve G'1), and much less than that of granules preheated to 800° C. (curve G'2).

In addition it has been observed that in order to have the same resistance, the agglomerates in the form of pellets can be made by starting with a much coarser powder than that which is necessary for granules.

FIG. 2 shows the comparative results for granules and agglomerates in the form of pellets, produced from the same powdered raw material (4.850 cm.$^2$/g. Blaine), preheated to different temperatures in degrees C.

The curve $\beta$ shows the resistance to compression in kg. of agglomerates in the form of pellets, as a function of the temperature of preheating.

The curve $\alpha$ shows the resistance to compression of granules. For a preheating temperature of 800° C., the granules exhibit a resistance to compression of about 2.5 kg., while the agglomerates in the form of pellets produced in accordance with the invention exhibit a resistance to compression which is greater than 6 kg., and which is only attained by the granules with a temperature of preheating greater than 1,000° C.

FIG. 2 further shows the percentage of abrasion of the granules and of the agglomerates in the form of pellets (curves $\alpha'$ and $\beta'$). For a preheating temperature of 800° C., the granules have an abrasion of almost 8 percent. For the same temperature, the agglomerates in the form of pellets made in accordance with the invention only show an abrasion of about 1 percent.

The important improvement in resistance to abrasion and to compression obtained by the process of the invention may be explained by the fact that the material, during the production of the agglomerates in the form of pellets, is subjected to compression which affects the structure of the agglomerates. In particular, in the pellets, the exterior surface is smooth, the particles which are less fine having been forced inward from the surface which has rubbed against the sleeve, in contrast to the situation which exists for the granules. It has been confirmed by experience that the dust from abrasion is much more fine in the case of the pellets.

This structure of the pellets, which differs totally from that of the granules, produces still another very important advantage: it has been established that the pellets not only possess, with an equal fineness of pulverization, a higher resistance to compression and to abrasion than granules, but also that they exhibit a better and remarkable resistance to thermal shock.

Another important characteristic has been established in favor of the pellets. For the same material, the mean of the total porosity of the granules and of the pellets is analogous, but the standard deviation of the measurements on the pellets is several times less.

There result from the characteristics of the pellets hereinbefore described the following advantages for the invention:

For the process of the present invention and apparatus required to carry out the process: a pulverization less advanced than that which would be necessary for granules, an important simplification (screening, recirculation of fines) of the circuits for the preparation of the raw agglomerates, an improved productivity for the apparatus for treatment in porous beds, and furthermore, in the grate rotary kiln system, a lower preheating temperature, which renders the apparatus less expensive and obviates the necessity of utilizing a protective layer.

Figure 3:
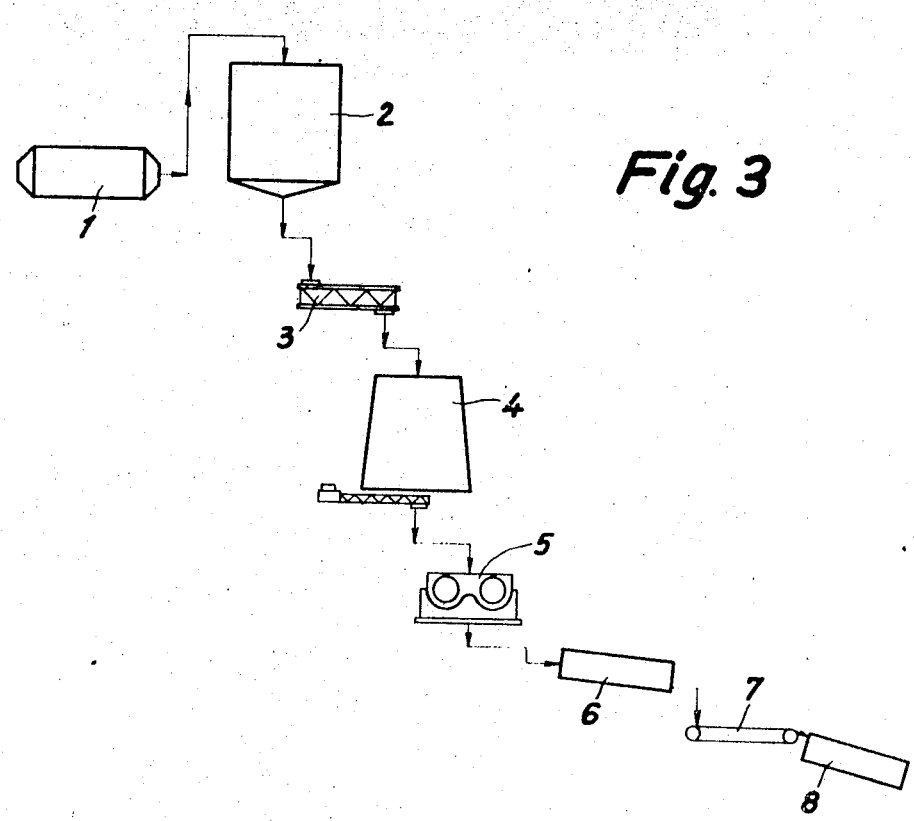
FIG. 3 is a schematic view of an apparatus for carrying out the process according to the invention.

The apparatus represented in FIG. 3 comprises equipment 1 for pulverizing the mineral, a silo 2 which, if the case requires, may serve equally for homogenization and for mixing of the powdered raw materials, followed by an apparatus 3 for the moistening of the powder with the measured addition of liquid and possibly with other additives.

The paste produced in this manner may be homogenized subsequently in a silo 4, before arriving at the apparatus 5 for production of the pellets. Then the pellets are conducted to the apparatus 6, which may be a drum, a disc, or a belt conveyor or an inclined plane, and which rounds off the rough edges of the pellets by causing then to roll upon one another. Thereafter, the heat treatment is effected. It may take place, for example, upon a traveling grate 7 followed by a rotary kiln 8.

Figure 4:
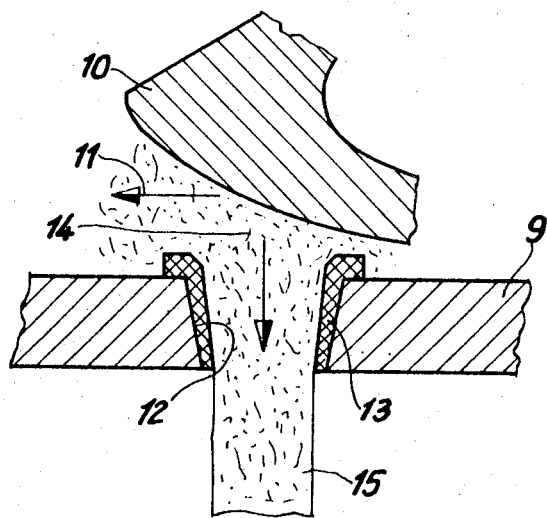
FIG. 4 is a section of a means for producing pellets in accordance with the invention.

A detail of the apparatus 5 for the production of pellets is represented in FIG. 4. It comprises a receptacle the bottom 9 of which is a perforated sheet, above which at least one kneading arm 10 brushes periodically in the transverse direction (arrow 11). The inner wall of the holes 12, one of which is illustrated, is furnished with a sleeve 13, which is made of a material having a low coefficient of friction, for example a plastic material.

When the kneading arm 10 passes above the hole 12, the paste 14, which is in the receptacle, is pressed through the hole 12, thus forming a rod 15 which is separated into pellets as hereinbefore described.

The invention is not limited to the embodiment illustrated and described, which is given only by way of example.

What is claimed is:

1. A method of preparing iron ore in the form of agglomerates for use in a metallurgical process, comprising:
   a. mechanically pulverizing iron ore to a powder having a specific surface area of 2,000–5,000 cm.$^2$/gram, the largest particles being less than 500 microns,
   b. mixing said iron ore powder with an amount of a binding liquid to form a paste,
   c. extruding said paste through perforations to produce rods having a diameter of 5–40 mm.,
   d. separating said rods into pellets having a length/diameter ratio of 0.7–2.5, and
   e. heating said pellets to a temperature of 500°–850° C.

2. A method according to claim 1 wherein the pellets are rolled before being heated, to round off their rough edges.

* * * * *